United States Patent [19]

Bruckert et al.

[11] Patent Number: 5,778,030
[45] Date of Patent: Jul. 7, 1998

[54] METHOD AND APPARATUS FOR POWER CONTROL IN A COMMUNICATION SYSTEM

[75] Inventors: Eugene J. Bruckert, Arlington Heights; Thomas A. Sexton, Schaumburg; Robert T. Love, Barrington; William R. Bayer, Palatine, all of Ill.

[73] Assignee: Motorola, Inc., Schaumburg, Ill.

[21] Appl. No.: 616,797

[22] Filed: Mar. 15, 1996

[51] Int. Cl.⁶ ............................................. H04L 25/06
[52] U.S. Cl. ............................................. 375/317
[58] Field of Search ............................ 375/316, 317, 375/200; 455/33.1, 38.3, 54.1, 69, 441; 379/59

[56] References Cited

U.S. PATENT DOCUMENTS

| 5,216,692 | 6/1993 | Ling | 375/200 |
| 5,267,262 | 11/1993 | Wheatley, III | 375/200 |
| 5,448,761 | 9/1995 | Ushirokawa | 455/452 |
| 5,450,453 | 9/1995 | Frank | 375/200 |
| 5,548,806 | 8/1996 | Yamaguchi et al. | 455/33.1 |

FOREIGN PATENT DOCUMENTS 2287379  9/1995  United Kingdom ............ H04Q 7/32

OTHER PUBLICATIONS

IS-95, TIA/EIA, pp. 7-12/7-15.

Primary Examiner—Stephen Chin
Assistant Examiner—Kevin Kim
Attorney, Agent, or Firm—Kenneth A. Haas

[57] ABSTRACT

Power control in a spread spectrum communication system takes place by determining a speed of a remote unit (405) and assigning as a power-control threshold a target threshold based on the determined speed (410). An instantaneous threshold value is created (415) based on frame-quality information and the target threshold. An energy of a power-control group transmitted (430) from a remote unit is compared to the instantaneous threshold value and a power-adjustment command is determined. The power-adjustment command is transmitted to the remote unit instructing the remote unit to adjust its power accordingly.

14 Claims, 5 Drawing Sheets

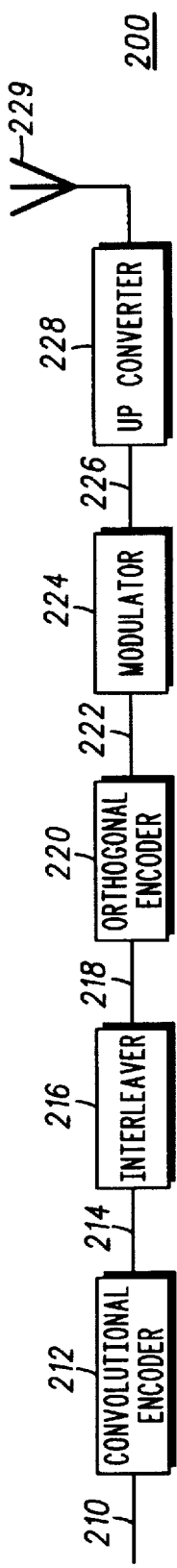
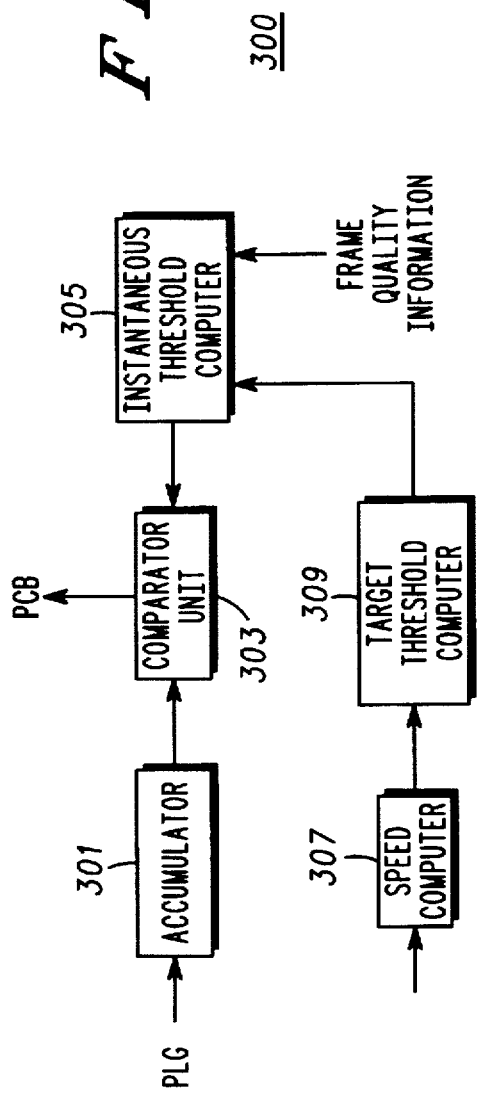

METHOD AND APPARATUS FOR POWER CONTROL IN A COMMUNICATION SYSTEM

FIELD OF THE INVENTION

The present invention relates generally to communication systems and, in particular, to power control in a spread spectrum communication system.

1. Related Inventions

The present invention is related to "Method and Apparatus for Power Control in a Communication System" (Attorney Docket No. CE02994R), having Ser. No. 08/616,542 filed on Mar. 15, 1996, and assigned to the assignee of the present invention.

2. Background of the Invention

Communication systems are known to employ power control methods which control transmission energy of remote units. One such communication system employing power control is a spread spectrum communication system. Power control in a spread spectrum system serves two main functions. Firstly, because each remote unit's signal in a spread spectrum system is typically transmitted in the same frequency band, a majority of the noise (which is inversely proportional to bit energy per noise density i.e., $E_b/N_0$ which is defined as the ratio of energy per information-bit to noise-spectral density), associated with a received signal can be attributed to other remote units' transmissions. The magnitude of noise is directly related to the received signal power of each of the other remote units' transmissions. Thus it is beneficial for a remote unit to transmit at the lowest power level possible. Secondly, it is desirable to dynamically adjust the power of all remote units in such a way that their transmissions are received by the base station with approximately the same power level. To accomplish this, it is necessary for the closest transmitters to reduce their power by as much as 80 dB when compared to the power of the furthest transmitters.

The current method of controlling reverse channel power in a code-division, multiple-access (CDMA) system is described in Cellular System Remote unit-Base Station Compatibility Standard of the Electronic Industry Association/Telecommunications Industry Association Interim Standard 95 (TIA/EIA/IS-95A), which is incorporated by reference herein. (EIA/TIA can be contacted at 2001 Pennsylvania Ave. NW Washington DC 20006). As described in TIA/EIA/IS-95A, a power-control group is transmitted from the remote unit and received by the base station. The base station compares the energy of the power-control group to a threshold and instructs the remote unit to power up or down accordingly by transmitting a power-adjustment command (power-control bit) to the remote unit. While the present algorithm does insure that the threshold level does not contribute to long runs of frame errors where the remote unit is not transmitting at a high enough power level, the power level of the remote unit can be higher than necessary for lengthy periods of time, needlessly contributing to system noise.

Thus a need exists to reduce noise in a CDMA system by dynamically adjusting the power-control threshold.

BRIEF DESCRIPTION OF THE DRAWINGS

FIG. 2 is a block diagram of a preferred embodiment of a base station transmitter that can utilize the present invention.

FIG. 3 illustrates apparatus for controlling reverse channel power in accordance with a preferred embodiment of the present invention.

FIG. 13 illustrates a time-domain diagram of instantaneous threshold values in accordance with a preferred embodiment of the invention.

DESCRIPTION OF A PREFERRED EMBODIMENT

Power control in a spread spectrum communication system takes place by determining a speed of a remote unit and assigning a power-control threshold a target value based on the determined speed. An instantaneous threshold value is created based on frame-quality information and the power-control threshold. An energy of a power-control group transmitted from a remote unit is compared to the instantaneous threshold value and a power-adjustment command is determined. The power-adjustment command is transmitted to the remote unit instructing the remote unit to adjust its power accordingly. This method of threshold adjustment reduces the amount of time that the remote unit's power level is higher than necessary, thus reducing unwanted noise in the system.

Generally, the present invention encompasses a method for power control in a communication system comprising the steps of determining a speed of a remote unit and assigning a power-control threshold a target threshold based on the speed of the remote unit.

An alternate embodiment encompasses a method of power control in a communication system comprising the steps of determining an energy of a received signal and determining a speed of a remote unit. A power-control threshold value is determined based on the speed, and the received energy is compared to the power-control threshold value. A power-adjustment command is then sent to the remote unit based on the comparison.

Yet another embodiment encompasses an apparatus for power control in a communication system, the apparatus comprising a speed computer for determining a speed of a remote unit and a target threshold computer coupled to the speed computer, the target threshold computer determining a target threshold based on the speed of the remote unit.

Another embodiment encompasses a method for power control in a communication system, the method comprising the step of assigning a power-control threshold a target threshold based on a statistic.

Figure 1:
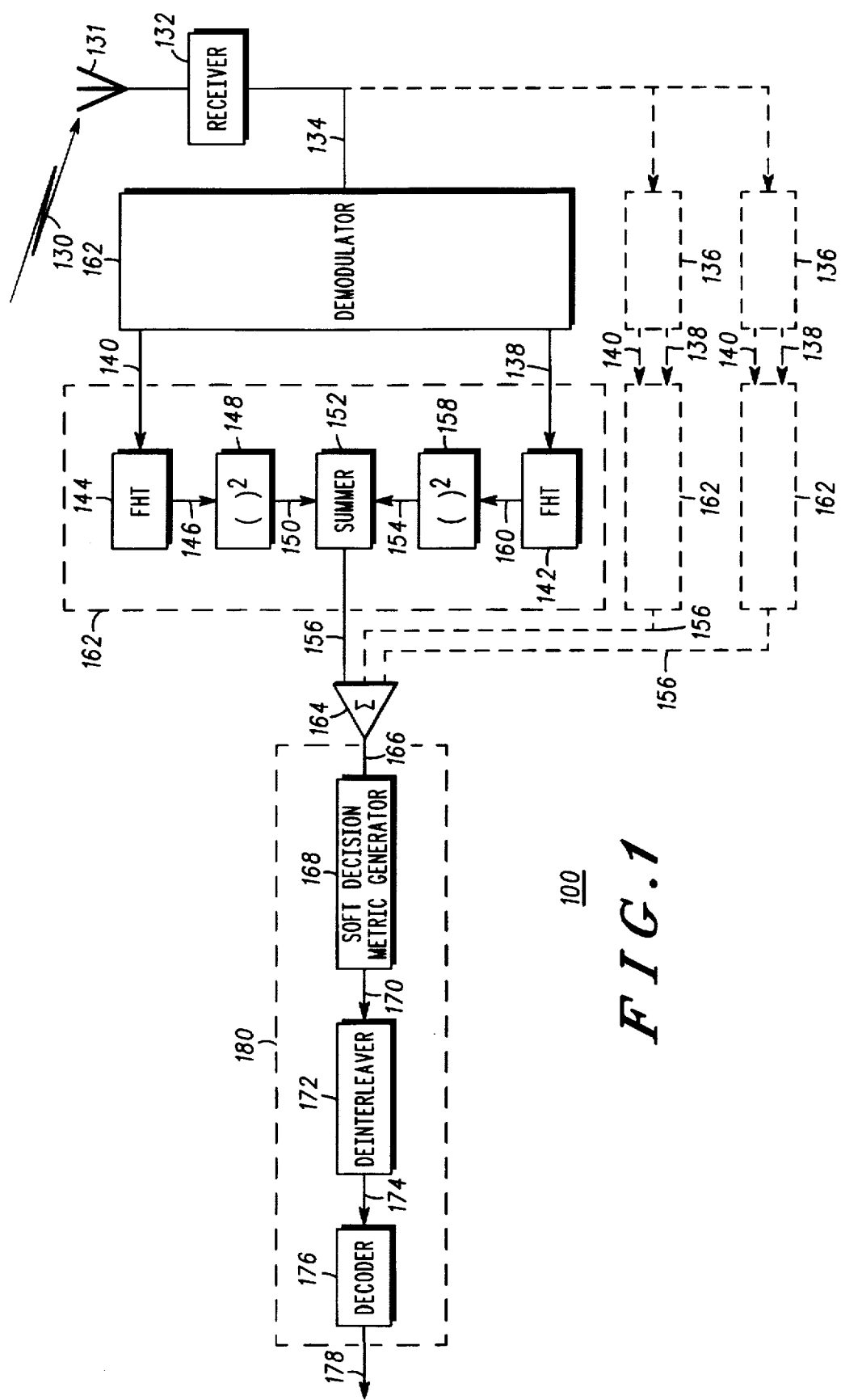
FIG. 1 is a block diagram of a preferred embodiment of a base station receiver that can utilize the present invention.

FIG. 1 is a block diagram of a preferred embodiment of a base station receiver 100 for receiving a power-control group transmitted by a remote unit. Orthogonally encoded spread-spectrum digital signal 130 is received at receive antenna 131 and amplified by receiver 132 before being despread and demodulated 136 into in-phase 140 and quadrature 138 components. Components 138, 140 of despread digital samples are then grouped into predetermined length groups (e.g., 64 sample length groups) of sampled signals that are independently input to orthogonal decoders in the form of fast Hadamard transformers 142, 144, which despread the orthogonally encoded signal components producing a plurality of despread signal components 146 and 160, respectively (e.g. when 64 sample length groups are input, then 64 despread signals are generated). In addition, each transformer output signal 146, 160 has an associated Walsh index symbol which identifies each particular orthogonal code from within a set of mutually orthogonal codes (e.g. when 64 sample length groups are input, then a 6 bit length index data symbol can be associated with the transformer output signal to indicate the particular 64 bit length orthogonal code to which the transformer output signal corresponds). The energy values with the same Walsh index in each group of resulting signal 156 from each branch of receiver 100 will then be summed at summer 164 to provide a group of summed energy values 166. The energy value with index i in the group of summed energy values 166 corresponds to a measure of confidence that the group of sampled signals, which generate this group of summed energy values 166, corresponds to the i-th Walsh symbol. The group of summed energy values with associated indices will then be sent to a soft decision metric generator 168 where a single metric for each encoded data bit is determined, thereby producing a single set of aggregate soft decision data 170. The aggregate soft decision data 170 is then deinterleaved by deinterleaver 172 prior to final maximum likelihood decoding by decoder 176.

FIG. 2 is a block diagram of a preferred embodiment of a CDMA transmitter 200 for transmitting a power-adjustment command to a remote unit. In a preferred embodiment the power-adjustment command is a power-control bit such that a "0" bit indicates to the remote unit to increase the mean output power level, and a "1" bit indicates to the remote unit to decrease the mean output power level. Transmitter 200 is preferably a transmitter such as that defined by TIA/EIA/IS-95A. Transmitter 200 includes convolutional encoder 212, interleaver 216, orthogonal encoder 220, modulator 224, upconverter 228, and antenna 229.

During operation, signal 210 (traffic channel data bits) is received by convolutional encoder 212 at a particular bit rate (e.g., 9.6 kbitsecond). Input traffic channel data 210 bits typically include voice converted to data by a vocoder, pure data, or a combination of the two types of data. Convolutional encoder 212 encodes input data bits 210 into data symbols at a fixed encoding rate with an encoding algorithm which facilitates subsequent maximum likelihood decoding of the data symbols into data bits (e.g. convolutional or block coding algorithms). For example, convolutional encoder 212 encodes input data bits 210 (received at a rate of 9.6 kbitsecond) at a fixed encoding rate of one data bit to two data symbols (i.e., rate ½) such that convolutional encoder 212 outputs data symbols 214 at a 19.2 ksymbol/second rate.

Data symbols 214 are then input into interleaver 216. Interleaver 216 interleaves the input data symbols 214 at the symbol level. In interleaver 216, data symbols 214 are individually input into a matrix which defines a predetermined size block of data symbols 214. Data symbols 214 are input into locations within the matrix so that the matrix is filled in a column by column manner. Data symbols 214 are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. Interleaved data symbols 218 are output by interleaver 216 at the same data symbol rate that they were input (e.g., 19.2 ksymbol/second). The predetermined size of the block of data symbols defined by the matrix is derived from the maximum number of data symbols which can be transmitted at a predetermined symbol rate within a predetermined length transmission block. For example, if the predetermined length of the transmission block is 20 milliseconds, then the predetermined size of the block of data symbols is 19.2 ksymbol/second times 20 milliseconds which equals 384 data symbols which defines a 16 by 24 matrix.

Interleaved data symbols 218 are input to orthogonal encoder 220. Orthogonal encoder 220 modulo 2 adds an orthogonal code (e.g., a 64-ary Walsh code) to each interleaved and scrambled data symbol 218. For example, in 64-ary orthogonal encoding, interleaved and scrambled data symbols 218 are each replaced by a 64 symbol orthogonal code or its inverse. These 64 orthogonal codes preferably correspond to Walsh codes from a 64 by 64 Hadamard matrix wherein a Walsh code is a single row or column of the matrix. Orthogonal encoder 220 repetitively outputs a Walsh code or its inverse 222 which corresponds to input data symbol 218 at a fixed symbol rate (e.g., 19.2 ksymbol/second).

The sequence of Walsh codes 222 is prepared for transmission over a communication channel by modulator 224. The spreading code is a user specific sequence of symbols or unique user code which is output at a fixed chip rate (e.g., 1.228 Mchip/second). In addition, the user code spread encoded chips are scrambled by a pair of short pseudo-random codes (i.e. short when compared to the long code) to generate an I-channel and Q-channel code spread sequence. The I-channel and Q-channel code spread sequences are used to bi-phase modulate a quadrature pair of sinusoids by driving the power level controls of the pair of sinusoids. The sinusoids output signals are summed, bandpass filtered, translated to an RF frequency, amplified, filtered via upconverter 228 and radiated by an antenna 229 to complete transmission of the channel data bits 210.

FIG. 3 illustrates apparatus 300 for controlling reverse channel power in a CDMA system in accordance with a preferred embodiment of the present invention. Apparatus 300 includes accumulator 301, comparison unit 303, instantaneous threshold computer 305, speed computer 307, and target threshold computer 309. Operation of apparatus 300 occurs as follows: The remote unit's received signal is input into speed computer 307 which calculates the remote unit's speed. (Further details on calculating the remote unit's speed are discussed below). The speed of the remote unit is output from speed computer 307 and input into target threshold computer 309. Target threshold computer 309 determines a target threshold value based on the speed of the remote unit, and outputs this value to instantaneous threshold computer 305. (Further details on calculation of the target threshold are discussed below). Instantaneous threshold computer 305 determines an instantaneous threshold by adjusting the threshold value based on both frame quality information and the target threshold then outputs the instantaneous threshold value to comparison unit 303. The instantaneous threshold value is the value in which the energy of the remote unit is compared too when determining a power adjustment command. (Further details describing the calculation of the instantaneous threshold are discussed below).

The winning Walsh symbol energy detected from the remote units transmission over a power-control group (remote unit's received energy) interval is input into accumulator 301. Accumulator 301 calculates an energy of the remote unit and outputs this value to comparison unit 303. Comparison unit 303 compares the energy of the remote unit to the instantaneous threshold value and determines a power-control bit value based on the comparison. The power-control bit value is then output from comparison unit 303 and transmitted to the remote unit, instructing the remote unit to power up or down accordingly.

Figure 4:
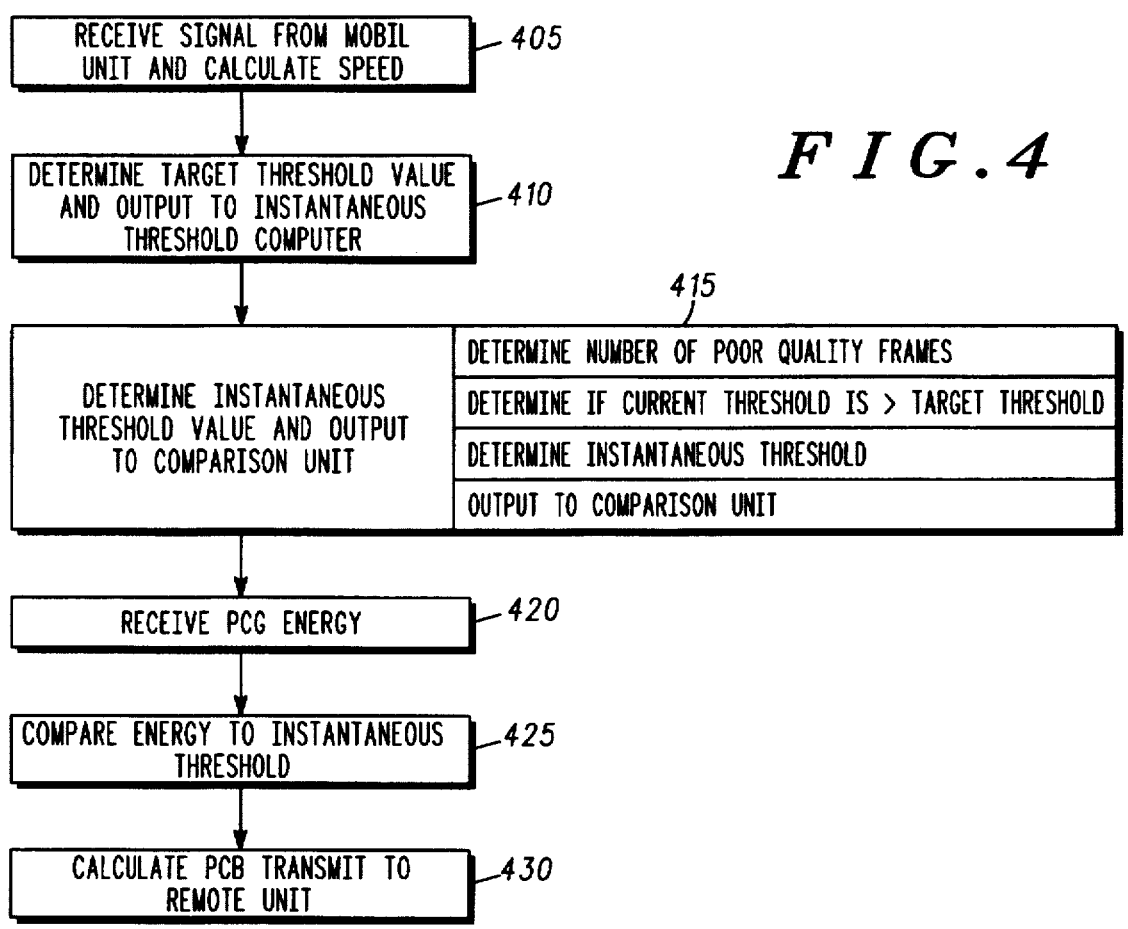
FIG. 4 is a flow chart of a preferred embodiment of operating apparatus of FIG. 3.

FIG. 4 is a flow chart of a preferred embodiment of operating apparatus 300 of FIG. 3. The logic flow begins at step 405 where speed computer 307 receives a signal from the remote unit and calculates the remote unit's speed. Next, at step 410 a target threshold value is computed by target threshold computer 309 and output to instantaneous threshold computer 305. Instantaneous threshold computer 305 determines an instantaneous threshold value (at step 415) and outputs this value to comparison unit 303. Comparison unit 303, at step 420, receives an energy of a power control group and at step 425 compares the energy of the power control group to the instantaneous threshold. Finally, at step 430, a power control bit is calculated from the comparison and sent to the remote unit.

Figure 5:
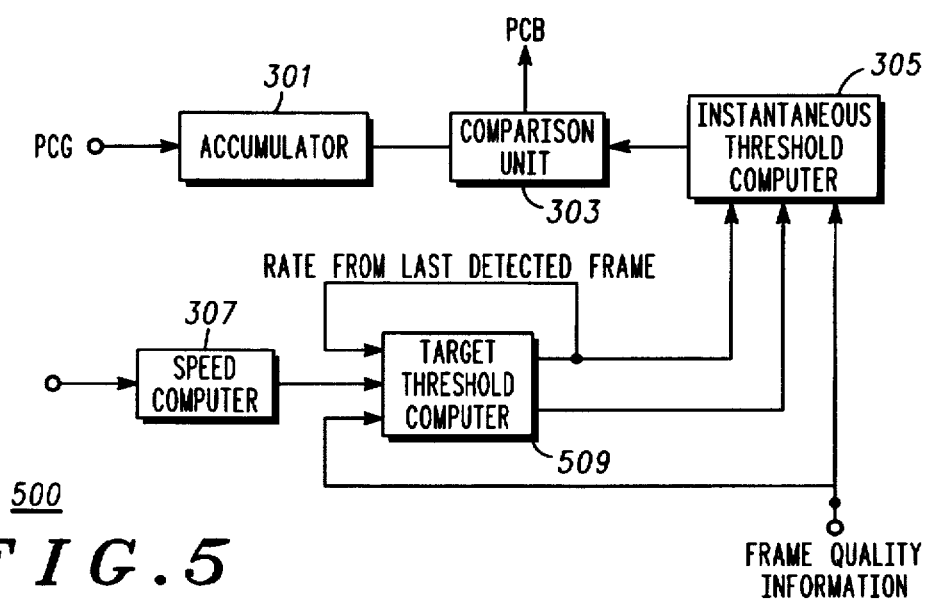
FIG. 5 illustrates apparatus for controlling reverse channel power in accordance with an alternate embodiment of the present invention.

FIG. 5 illustrates apparatus 500 for controlling reverse channel power in accordance with an alternate embodiment of the present invention. Apparatus 500 comprises accumulator 301, comparison unit 303, instantaneous threshold computer 305, speed computer 307, and target threshold computer 509. Operation of apparatus 500 occurs as follows: The remote unit's received signal is input into speed computer 307 which calculates the remote unit's speed. The speed of the remote unit is output from speed computer 307 and input into target threshold computer 509. Additionally, target threshold computer 509 receives frame quality information. In the alternate embodiment, target threshold computer 509 determines a target threshold value based on both speed of the remote unit and frame quality information, and outputs the target value to instantaneous threshold computer 305. In yet another embodiment, the target threshold computer 509 may determine the target threshold value based on statistic, such as frame quality information only. Continuing, instantaneous threshold computer 305 determines an instantaneous threshold by adjusting the threshold value based on the frame quality information and the target threshold then outputs the instantaneous threshold value to comparison unit 303.

The winning Walsh symbol energy detected from the remote units transmission over a power-control group interval is input into accumulator 301. Accumulator 301 calculates the energy of the remote unit and outputs this value to comparison unit 303. Comparison unit 303 compares the energy of the remote unit to the instantaneous threshold value and determines a power-control bit value based on the comparison. The power-control bit value is then output from comparison unit 303 and transmitted to the remote unit, instructing the remote unit to power up or down accordingly.

Estimation of Remote Unit's Speed

Because there exists a relationship between the bandwidth of a faded signal received from a remote unit and a remote unit's speed, an estimation of a remote unit's speed can be determined from estimating the bandwidth of the faded signal. In a preferred embodiment, a classic fading model is used in which the mobile is driving through an infinite field of minute scatterers which results in a U-shaped power spectrum, S(f). Assuming a vertically polarized electric field:

$$S(f) = \frac{S_0}{\sqrt{1-\left(\frac{f}{f_m}\right)^2}}$$

where $S_o$ is a constant giving the received power density within a small neighborhood of the transmit carrier frequency and f is the independent frequency variable.

The corresponding correlation function of the real part (R) of the electric field ($J_o$) in delay is $$R(v,\tau) = J_0(\beta v \tau)$$

where $\beta = 2\pi/\lambda$ $v$ = the remote unit's speed $\tau$ = the independent delay variable and $$f_m = \frac{\beta v}{2\pi}.$$

Estimating $f_m$ will provide an estimate of v. The standard deviation with respect to f of S(f) is:

$$\sigma = \frac{f_m}{\sqrt{2}}.$$

If the carrier is at 900 MHz (a typical operating frequency for CDMA), then:

$$\hat{v} = 1.06\sigma.$$

If frequency offset, $f_0$, is present, the resulting spectrum is $$S'(f) = S(f-f_0).$$

One can approximate $f_0$ by estimating a mean of the two sided, generally asymmetric, spectrum. The mobile speed may be estimated by finding the second central moment (variance) of the observed power spectrum, and the frequency offset between transmitter and receiver may be obtained by estimating the first moment (mean).

Figure 6:
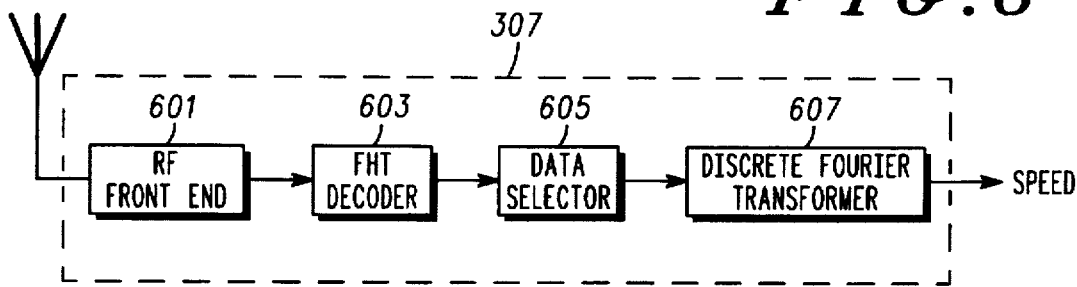
FIG. 6 illustrates a block diagram of speed computer of FIG. 3.

For example, a speed estimate is obtained by measuring the standard deviation of the remote unit's observed power spectrum. The remote unit's power spectrum is approximated by carrying out the following steps:

1.) compute the complex Fast Fourier Transform (FFT) of the data selection block (described in FIG. 6).

2.) form the magnitude square of the FFT

3.) average several magnitude square FFT's

4.) set to zero, terms in the average function which are below a threshold.

If the peak of the power spectral density (PSD) is denoted $PSD_{max}$, spectral values below $PSD_{max}/3.5$ are not included in the moment calculation. The threshold will, in general, be an inverse function of the signal-to-noise ratio.

FIG. 6 illustrates a block diagram of speed computer 307 of FIG. 3. Speed computer 307 comprises RF front end 601, Fast Hadamard Transform (FHT) decoder 603, Data Selector 605, and discrete Fourier transformer (DFT) 607. Operation of speed computer 307 occurs as follows: A mixed, downconverted, and despread signal emerging from RF front end 601 enters FHT decoder 603 where the incoming signal is decoded. FHT data, called Walsh symbols in this context, emerge from FHT decoder 603 at a rate of 4800 Hz. At a typical operating point, about 20% of the winning Walsh indexes do not correspond to the index of the transmitted Walsh symbol, i.e., 20% of the winning Walsh indexes are wrong. FHT data enters data selector 605, and may be passed to DFT 607 as the complex FHT output corresponding to the winning index or, if side information is available telling which indices were incorrect, the corresponding soft outputs may be erased (set to 0+j0). Such side information could be made available by re-encoding frames which have a cyclic redundancy check (CRC) that passes as described in "A Method and Apparatus for Estimating a Channel Parameter in a Digital Radio Frequency Communication System" (Docket No. CE02963R Sexton) which is incorporated by reference herein by reference. Every group of six re-encoded bits would be the true Walsh index. A falsing event would occur at the rate at which the CRC reports a frame decoded correctly when it has actually decoded incorrectly. For a 12 bit CRC, the probability of this is roughly 0.025%. A further improvement is accomplished by saving FHT outputs with the N largest magnitudes, denoted the "very likely" set. In this case, rather than an erasure, the proper value is fetched from one of the N "very likely". If the correct index is not one of those saved, an erasure takes place. In the exhaustive case, N=64 and no erasures are necessary. Yet another variation would be to use winning Walsh symbols unless the frame fails to pass the CRC, relying on frames passing the CRC to have fewer symbols in error than others.

In a preferred embodiment, the DFT design parameters are:

1. the number of input terms in the calculation of a single DFT (2 frames, 192 symbols used here).
2. the number of frequency points in the output DFT (4*192).
3. the number of DFT's averaged before computation of means and variances (5, i.e., once per 10 input frames).
4. the time constant used to filter the offset and speed estimates obtained immediately from the mean and variance.

In an alternate embodiment a power control bit stream is utilized for calculating the remote unit's speed. At the low speed, the power control bit stream exhibits periods of a regular up/down pattern that corresponds to channel coherence time. When neither signal is faded the pattern is similar to '1111106000111100000.' Thus an indication of velocity can be obtained by searching for discrete components in a frequency transform of the power control bit stream. If it is determined that much of the energy is located at a few predetermined frequency groups, the remote unit's speed is low, otherwise the remote unit's speed is high. The following steps are taken in the alternate embodiment:

1. Buffer the power-control bit stream for 2 frames (32 bits).
2. When the buffer is full, compute a 32-ary Fast Hadamard Transform of the bits, treating 0's as −1's and 1's as 1's.
3. Examine the 32 outputs. If 50% of the energy is located at 8 or fewer predetermined terms, declare the speed to be less than 10 mph; otherwise declare it to be above 10 mph.

Estimate of target threshold

Figure 7:
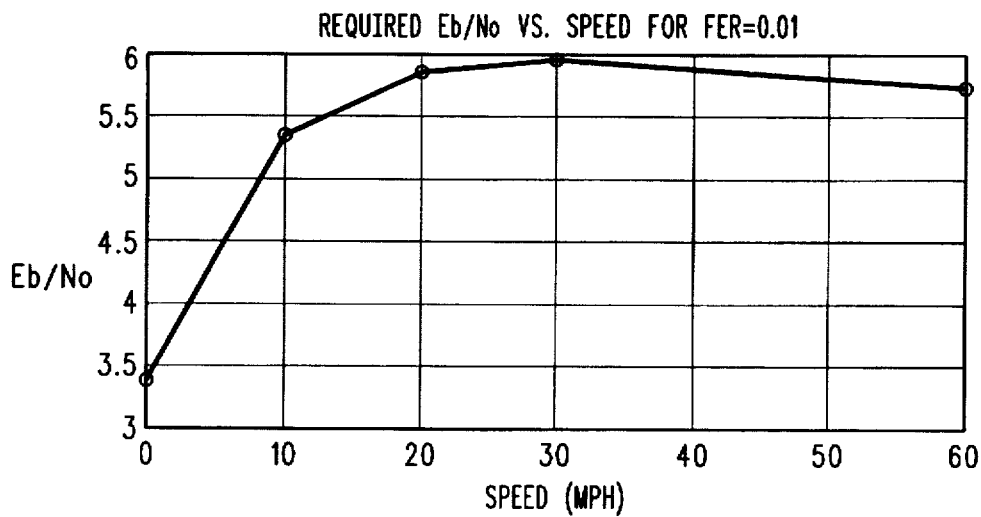
FIG. 7 illustrates a relationship between remote unit speed and $E_b/N_0$ for a 1% frame erasure rate.

FIG. 7 shows a typical plot of $E_b/N_0$ necessary to achieve 1% frame erasure rate (FER) for a 9.6 kbits/s data rate versus remote unit speed. In a preferred embodiment, speed computer 307 provides target threshold computer 309 with the remote unit's speed and the target threshold is derived by target threshold computer 309 from tables of $E_b/N_0$ vs. speed, with the desired FER as a parameter. Target threshold computer 309 uses the speed of the remote unit to adjust the target threshold for the desired FER based on a target threshold tables stored internal to target threshold computer 309.

As discussed in reference to FIG. 5, an alternate embodiment of the present invention determines a target threshold by utilizing frame quality information in addition to the remote unit's speed. In this embodiment target threshold is derived by target threshold computer 509 from tables of $E_b/N_0$ vs. speed, until an excessive amount of frame erasures or an excessive amount of poor quality frames (indicated by the frame quality information) are detected. For example, target threshold computer 509 utilizes the remote unit's speed in determining the target threshold until the target threshold computer 509 determines the average frame quality is poor at which time the target threshold is increased by 0.1 dB. The above procedure can be extended to the case where the adjustment occurs when the bad full rate frames are detected within a specific interval. Conversely, when the target threshold computer 509 determines that the average frame quality is above a threshold, the target threshold is reduced by 0.1 dB.

As discussed above, an alternate embodiment of the present invention utilizes only frame quality information in determining a target threshold. There are several methods to determine how and when to adjust the target threshold. All or a subset can be used.

Figure 8:
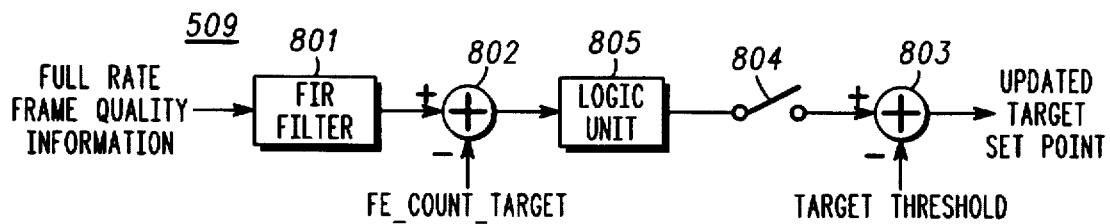
FIG. 8 illustrates a preferred embodiment of the target threshold computer of FIG. 5.

FIG. 8 illustrates a target threshold computer 509 of FIG. 5 according to a preferred embodiment. Target threshold computer 509 comprises a finite impulse response (FIR) filter 801, summer units 802 and 803, switch 804, and logic unit 805. Operation of target threshold computer 509 occurs as follows: Full rate frame quality information enters FIR filter 801. FIR filter 801 uses a 'first-in-first-out' buffer to store each of the N full-rate frame quality information values. In this embodiment, if frame rate information is indeterminable, rate information from the last determinable frame is used. The "newest" full-rate frame's quality value enters FIR filter 801, and replaces the "oldest" full rate frame's quality value in FIR filter 801. FIR filter 801 outputs a number of poor quality frames existing within its buffer to summer 802. Summer 802 computes a difference between the number of erased frames existing within FIR filter 801 and a target frame erasure value. The difference between the target value and the current number of erased frames (error_fe(k)) at time interval k existing within FIR filter 801 is output from summer 802, and input into logic unit 805. Logic unit 805 determines a value (k2* error_fe(k)) to adjust the current target threshold value. In a preferred embodiment k2=30 if error_fe(k) is greater than 0, k2=20 if error_fe(k) is less than 0, and k2=0 if error_fe(k) is equal to 0. The adjustment is applied via switch 804 every n2 frames, where n2=75. The adjustment is output to summer 803 when switch 804 closes, and is added to the current target threshold to produce an updated target threshold.

Figure 9:
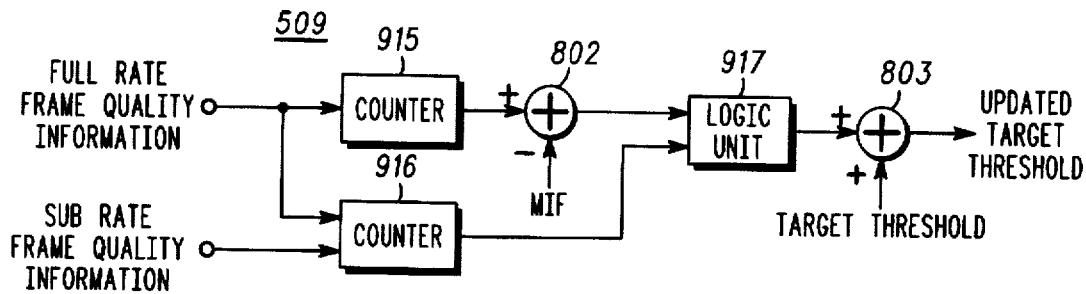
FIG. 9 illustrates an alternate embodiment of the target threshold computer of FIG. 5.

FIG. 9 illustrates an alternate embodiment of the target threshold computer 509 of FIG. 5. In this embodiment, target threshold computer 509 increases the target threshold should the time between bad full rate frames become too small. Target threshold computer 509 comprises consecutive good full rate frame counter 915, good full rate and sub-rate frame counter 916, summer units 802 and 803, and logic unit 917. In a preferred embodiment, good full rate plus sub-rate counter 916 and consecutive full rate frame counter 915 are set to zero whenever a bad full rate frame is detected. If frame rate information is indeterminable, rate information from the last determinable frame is used. Consecutive good full rate frame counter 915 outputs a number of consecutive good full rate frames (nc_gfr) to summer 802. Summer 802 computes a difference between nc_gfr and a minimum time between full rate bad frame threshold (MIF) which is inversely proportional to the desired full rate bad (e.g. erasure) frame rate. Summer 802 outputs a resulting difference (e_fr_tbbf(k)=nc_gfr-MIF) for frame interval k to logic unit 917. Good full rate plus sub-rate frame counter 916 outputs to logic unit 917, the number of good full rate frames plus the number of good sub-rate frames (ng_frpsr) since the last full rate bad frame was encountered. Logic unit 917 determines a target threshold adjustment (z(k)) based on the inputs e_fr_tbbf(k) and ng_frpsr in the following manner:

```
if( e_fr_tbbf(k) < MIF) then
    if( ng_frpsr>MIF) then
        z(k) = a2*(1- (1/MIF))*nc_bfr+b2
    else
        z(k) = (a2*(1-(1/MIF))*nc_gfr+b2 )/c2
    end if
end if
``` where

MIF=d2/Desired Full Rate Bad frame rate

In a preferred embodiment a2=256, b2=100, c2=4, and d2=0.6. Adjustment z(k) is output to summer 803 where it is added to the current target threshold.

Figure 10:
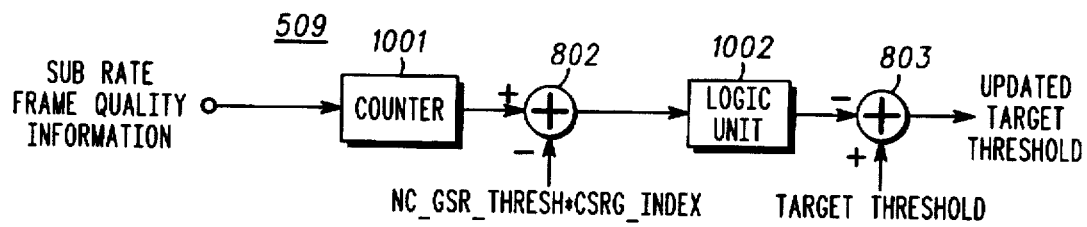
FIG. 10 illustrates an alternate embodiment of the target threshold computer of FIG. 5.

FIG. 10 illustrates another alternate embodiment of the target threshold computer 509 of FIG. 5. In this embodiment, target threshold computer 509 decreases the target threshold should a number of consecutive good sub-rate frames become too large. Target threshold computer 509 comprises consecutive good sub-rate frame counter 1001, summers 802 and 803, and logic unit 1002. Consecutive good sub-rate counter 1001 is reset whenever a bad sub-rate frame is detected. In this embodiment, if frame rate information is indeterminable, rate information from the last determinable frame is used.

Operation of target threshold computer 509 occurs as follows: Consecutive good sub-rate frame counter 1001 outputs a number of good sub-rate frames (nc_gsr) to summer 802. Summer 802 computes a difference between nc_gfr and the consecutive good sub-rate threshold given by the product of (nc_gsr_thresh*CSRg_index). The parameter nc_gsr_thresh represents a minimum desired time between sub-rate bad frames. The minimum desired time between sub-rate bad frames is related to the desired full rate bad (e.g. erasure) frame rate as follows:

nc_gsr_thresh=d3/Desired Full Rate Bad frame rate
where d3 is set to 2/3 in the preferred embodiment.

The parameter CSRg_index is incremented each time nc_gfr exceeds the threshold. Both nc_gsr and CSRg_index are reset to 0 and 1 respectively when a sub-rate or full rate bad frame is detected. The summer 802 outputs the resulting difference (e_cgsr(i)=nc_gsr(nc_gsr_thresh*CSRg_index)) for frame interval k to logic unit 1002. Logic unit 1002 determines a new adjustment (z(k)) to apply to the target threshold via the following method:

```
if (e_cgsr(k)>0) then
    if ( iw(k)>w(k)) then
        iw(k+1) = w(k)
        z(k)= 0
    else
        if(w(k)> thresh1)
            z(k)= k6*CSRg_index
        else
            z(k)= k7*CSRg_index
        end if
    end if
    CSRg_index = CSRg_index + 1
end if
``` where w(k) is the current target threshold level and iw(k) is the instantaneous threshold. In a preferred embodiment k6=30, k7=10, and thresh1=nominal target threshold level (which is hardware and system dependent). The adjustment z(k) is output to summer 803 where it is subtracted from the current target threshold to produce the updated target threshold.

Figure 11:
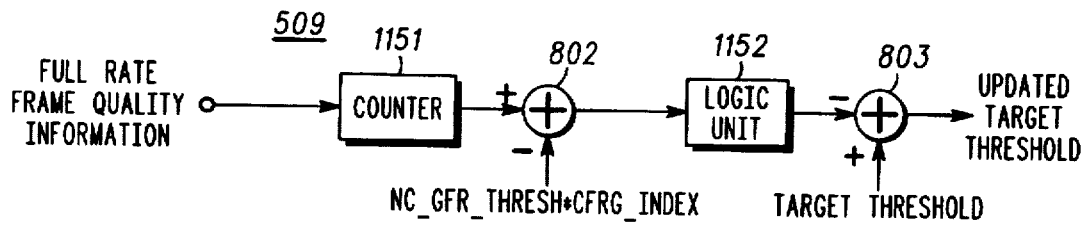
FIG. 11 illustrates an alternate embodiment of the target threshold computer of FIG. 5.

FIG. 11 illustrates an alternate embodiment of the target threshold computer 509 of FIG. 5. In this embodiment, the target threshold computer 509 is used to decrease the target threshold should the number of consecutive good full rate frames become too large. If frame rate information is indeterminable, rate information from the last determinable frame is used. Target threshold computer 509 comprises consecutive good full rate frame counter 1151, summer units 802 and 803, and logic unit 1152. Consecutive good full rate frame counter 1151 is reset whenever a bad full rate frame is detected. Consecutive good full rate frame counter 1151 outputs a number of good full rate frames (nc_gfr) to summer 802. Summer 802 computes a difference between nc_gfr and the consecutive good full rate threshold given by the product of (nc_gfr_thresh*CFRg_index). The parameter nc_gfr_thresh represents a minimum desired time between full rate bad frames. The minimum desired time between sub-rate bad frames is related to the desired full rate bad (e.g. erasure) frame rate as follows:

nc_gfr_thresh=d4/Desired Full Rate Bad frame rate
where d4 is set to 3/2 in the preferred embodiment.

The parameter CFRg_index is incremented each time nc_gfr exceeds the threshold. Both nc_gfr and CFRg_index are reset to 0 and 1 respectively when a full rate bad frame is detected or consecutive sub-rate bad frames are detected. Summer 802 outputs the resulting difference (e_cgfr(i)=nc_gfr-(nc_gfr_thresh*CFRg_index)) for frame interval k to the logic unit 1152. Logic unit 1152 determines a new adjustment (z(k)) to apply to the target threshold via the following method:

```
if (e_cgfr(k) > 0) then
    if ( iw(k) > w(k) ) then
        iw(k+1) = w(k)
        z(k) = 0
    else
        if(w(k) > thresh1)
            z(k) = k3*CFRg_index
        else
            z(k) = k4*CFRg_index
        end if
    end if
    CFRg_index = CFRg_index + 1
end if
``` where w(k) is the current target threshold level and iw(k) is the instantaneous threshold. In the preferred embodiment k3=50, k4=30, and thresh1=nominal target threshold level which is hardware and system dependent. The adjustment z(k) is output to the summer 803 where it is subtracted from the current target threshold to produce the updated target threshold.

Figure 12:
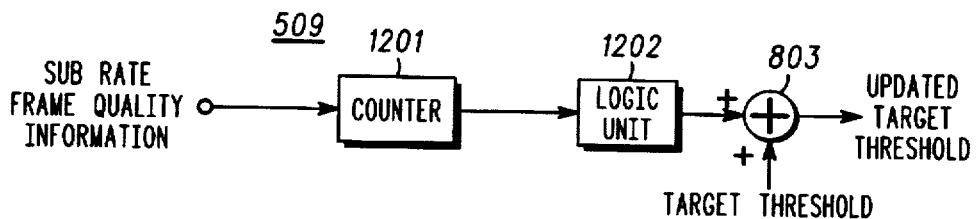
FIG. 12 illustrates an alternate embodiment of the target threshold computer of FIG. 5.

FIG. 12 illustrates yet another alternate embodiment of the target threshold computer 509 of FIG. 5. In this embodiment the target threshold computer 509 increases the target threshold should a number of consecutive bad sub-rate frames become too large. In this embodiment, if frame rate information is indeterminable, rate information from the last determinable frame is used. Target threshold computer 509 comprises consecutive bad sub-rate frame counter 1201, summer unit 803, and logic unit 1202. Operation of target threshold computer 509 occurs as follows: Consecutive bad sub-rate frame counter 1201 outputs a number consecutive bad sub-rate frames (nc_bsr) to logic unit 1202. Consecutive bad sub-rate counter 1201 is reset whenever a good frame is detected. Logic unit 1202 determines a new adjustments z(k) to apply to the target threshold (w(k)) via the following method:

```
if (nc_bsr > thresh2) then
    z(k) = k5*nc_bsr
end if
```

In the preferred embodiment k5=10 and thresh2=1. The adjustment z(k) is output to summer 803 where it is subtracted from the current target threshold.

In an alternate embodiment adjustment iz(k) is calculated via the following method:

```
if (nc_bsr > thresh2) then
    iz(k) = SR_StepUp
endif
``` where SR_StepUp is the increase applied to the instantaneous threshold which is set to 30 in the preferred embodiment Calculation of Instantaneous threshold The instantaneous threshold utilized by comparison unit 303 for power control is a composite of a "sawtooth" type threshold, and the target threshold set by target threshold computer 309. In one embodiment, the instantaneous threshold originally starts out at the same value as the target threshold, and is increased for every bad frame detected and decreased for every good frame detected. In this embodiment, the instantaneous threshold is increased by a smaller amount if the instantaneous threshold is lower than the target threshold. In a preferred embodiment, the instantaneous threshold is increased by 0.5 dB for every full rate bad frame occurring when the instantaneous threshold is greater than the target threshold, and is increased by 1.0 dB for every full rate bad frame when the instantaneous threshold is below the target threshold. The instantaneous threshold is also increased by an amount proportional to the number of consecutive bad sub-rate frames.

Conversely, the instantaneous threshold is reduced rather quickly for each good full-rate frame received by the base station until the instantaneous threshold approaches the target threshold, at that point, the rate-of-change in the instantaneous threshold is reduced. In the preferred embodiment, the instantaneous threshold is reduced by 0.1 dB for every good full-rate frame received when it is greater than, or equal to the target threshold, and is reduced by 0.01 dB for every good full-rate frame received when it is less than the target threshold. In addition to the above scenario, the instantaneous threshold can be increased by a larger amount (1.5 dB in a preferred embodiment) if the FER becomes significantly higher than desired. This would act to quickly overcome any transitory interference.

In an alternate embodiment, the instantaneous threshold is increased whenever a stopped-to-moving transition is detected, even if there has been no poor quality frame detected. Increasing the instantaneous threshold in this manner mitigates the tendency to have bunched bad frames when a vehicle pulls away from a stop. Once it has been determined that the remote unit has stopped, a shorter average is performed to estimate when the subscriber starts to move again.

FIG. 13 illustrates a time-domain diagram of instantaneous threshold values in accordance with a preferred embodiment of the invention. At time t=0 the instantaneous threshold and the target threshold start out at the same value. Since no bad frames are detected, the instantaneous threshold is lowered at a rate of 0.01 dB per good frame detected. At time t=2 a bad frame is detected, and since the instantaneous threshold is below the target threshold, the instantaneous threshold is increased by 1.0 dB. After the 1.0 dB increase, the instantaneous threshold is above the target threshold, and the instantaneous threshold is lowered at a rate of 0.1 dB per good frame detected until the target threshold value is reached, at which point the instantaneous threshold is lowered at a rate of 0.01 dB per good frame detected.

Continuing, at time t=12, the remote unit begins accelerating and the target threshold increases accordingly. At time t=19 a bad frame is detected and the instantaneous threshold is again increased 1.0 dB. At time t=20 another bad frame is detected, but this time the instantaneous threshold is only increased by 0.5 dB since the instantaneous threshold is now above the target threshold. Finally, at t=21, the remote unit begins decelerating and the target threshold is reduced accordingly.

In an alternate embodiment, the instantaneous threshold originally starts out at the same value as the target threshold, and is increased for every bad full rate frame detected (in preferred embodiment the adjustment is approximately 1.5 dB) or for every consecutive sub-rate bad frame burst detected (in preferred embodiment the adjustment is approximately 0.1 dB). The instantaneous threshold is decreased for every good frame detected (in preferred embodiment the adjustment is approximately 0.05 dB). Also in this embodiment, the instantaneous threshold always returns (after enough good frames have been received) to the target threshold and is not allowed to drop below the target threshold. Whenever the target threshold level is increased the instantaneous threshold is reset to that level if it is currently less than the new target threshold value.

By comparing a remote unit's received power to an instantaneous threshold, as described above, overall system performance is improved over the prior-art method by reducing the remote unit's average transmit power by up to 0.5 dB. By reducing the remote units transmit power, system interference is reduced, allowing for an increase in overall network capacity.

The descriptions of the invention, the specific details, and the drawings mentioned above, are not meant to limit the scope of the present invention. For example, instead using the remote unit's speed to estimate a target threshold, one could use a mean FER value. It is the intent of the inventors that various modifications can be made to the present invention without varying from the spirit and scope of the invention, and it is intended that all such modifications come within the scope of the following claims.

What is claimed is:

1. A method for power control in a communication system where a base station compares an energy of a signal received from a remote unit to a first threshold and instructs the remote unit to power up or power down based on the comparison, the method comprising the steps of:

determining a speed of the remote unit;

adjusting the first threshold based on the speed to create a second threshold;

comparing the energy of the signal received from the remote unit to the second threshold;

instructing the remote unit to power up or power down based on the comparison to the second threshold; and further varying the second threshold based on a frame-quality measurement.

2. The method of claim 1 further comprising the step of transmitting a power-adjustment command based on the second threshold and a received power-control group.

3. The method of claim 1 wherein the speed of the remote unit is based on moments of a power spectral density from the signal received from the remote unit.

4. The method of claim 1 wherein the communication system comprises a code-division, multiple-access (CDMA) communication system.

5. A method for power control in a communication system where a base station compares an energy of a signal received from a remote unit to a first threshold and instructs the remote unit to power up or power down based on the comparison, the method comprising the steps of:

determining an energy of the received signal to produce a received energy;

determining a speed of the remote unit to produce a determined speed;

determining a second power-control threshold value based on the determined speed;

further varying the second threshold based on a frame-quality measurement;

comparing the received energy to the second power-control threshold value to produce a comparison; and sending a power-adjustment command to the remote unit based on the comparison.

6. The method of claim 5 wherein the received signal comprises a received power-control group.

7. The method of claim 5 wherein the step of determining the speed of the remote unit comprises the steps of:

buffering a fast Hadamard transform of a received signal to create a plurality of buffered elements;

computing a Discrete Fourier Transform of the plurality of buffered elements to create a DFT result;

forming a magnitude square of the DFT result to create a power spectral density estimate (PSD);

forming a second central moment of the PSD; and estimating a velocity based on the second central moment of the PSD.

8. An apparatus for power control in a communication system where a base station compares an energy of a signal received from a remote unit to an instantaneous threshold and instructs the remote unit to power up or power down based on the comparison, the apparatus comprising:

a speed computer for determining a speed of the remote unit;

a target threshold computer coupled to the speed computer, said target threshold computer determining a target threshold based on the speed of the remote unit;

an instantaneous threshold computer for determining the instantaneous threshold based on a quality of the signal transmitted by the remote unit and the target threshold.

9. The apparatus of claim 8 wherein the quality is based on frame erasures.

10. The apparatus of claim 8 further comprising a comparator coupled to comparison unit, said comparator providing the received energy to comparison unit.

11. An apparatus for power control in a communication system where a base station compares an energy of a signal received from a remote unit to a power-control threshold and instructs the remote unit to power up or power down based on the comparison, the apparatus comprising:

a target threshold computer for assigning the power-control threshold a target threshold based on a remote unit speed; and an instantaneous threshold computer for further varying the power control threshold based on a quality of the signal received from the remote unit.

12. The apparatus of claim 11 wherein the quality of the signal is based on a frame erasure rate (FER).

13. The apparatus of claim 11 further comprising a comparator coupled to comparison unit, said comparator providing the received energy to comparison unit.

14. A method for power control in a communication system where a base station compares an energy of a signal received from a remote unit to an instantaneous threshold and instructs the remote unit to power up or power down based on the comparison, the method comprising the steps of:

determining frame quality information;

adjusting the instantaneous threshold based on the frame quality information;

adjusting the instantaneous threshold at a first rate when the instantaneous threshold is above a target threshold;

adjusting the instantaneous threshold at a second rate when the instantaneous threshold is below the target threshold;

adjusting the target threshold based on the frame quality information;

comparing the energy of the signal received from the remote unit to the instantaneous threshold; and instructing the remote unit to power up or power down based on the comparison to the instantaneous threshold.

* * * * *